(12) United States Patent
He (10) Patent No.: US 8,315,301 B1
(45) Date of Patent: *Nov. 20, 2012

(54) FEEDFORWARD EQUALIZER FOR DFE BASED DETECTOR

(75) Inventor: Runsheng He, Sunnyvale, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/252,098

(22) Filed: Oct. 3, 2011

Related U.S. Application Data (63) Continuation of application No. 12/283,664, filed on Sep. 15, 2008, now Pat. No. 8,031,765, which is a continuation of application No. 11/011,178, filed on Dec. 15, 2004, now Pat. No. 7,426,236, which is a continuation of application No. 09/644,532, filed on Aug. 24, 2000, now Pat. No. 6,870,881.

(51) Int. Cl.
*H03H 7/30* (2006.01)

(52) U.S. Cl. ....................................... 375/233

(58) Field of Classification Search .............. 375/232, 375/233, 346, 348, 350; 708/319, 322, 323
See application file for complete search history.

(56) References Cited

U.S. PATENT DOCUMENTS

| | | |
|---|---|---|
| RE34,206 E | 3/1993 | Sayar |
| 5,327,460 A | 7/1994 | Batruni |
| 5,345,476 A | 9/1994 | Tsujimoto |
| 5,367,540 A | 11/1994 | Kakuishi et al. |
| 5,414,733 A | 5/1995 | Turner |
| 5,513,216 A | 4/1996 | Gadot et al. |
| 5,561,687 A | 10/1996 | Turner |
| 5,581,585 A * | 12/1996 | Takatori et al. ............... 375/376 |
| 5,604,769 A | 2/1997 | Wang |
| 5,617,450 A | 4/1997 | Kakuishi et al. |
| 5,748,674 A | 5/1998 | Lim |
| 5,793,801 A | 8/1998 | Fertner |
| 6,055,269 A | 4/2000 | Drost et al. |
| 6,115,418 A | 9/2000 | Raghaven |
| 6,144,697 A | 11/2000 | Gelfand et al. |
| 6,178,198 B1 | 1/2001 | Samueli et al. |
| 6,252,904 B1 | 6/2001 | Agazzi et al. |
| 6,459,730 B1 | 10/2002 | Samueli et al. |
| 6,775,529 B1 | 8/2004 | Roo |
| 6,870,881 B1 | 3/2005 | He |
| 7,167,516 B1 | 1/2007 | He |

* cited by examiner

*Primary Examiner* — Young T. Tse

(57) ABSTRACT

A transceiver including an equalizer, and a control circuit. The equalizer includes i) a unity tap comprising a coefficient input configured to receive a coefficient equal to 1, ii) a first plurality of taps including a first plurality of coefficient inputs—each configured to receive a respective one of first coefficients, wherein the first plurality of taps generate a first output signal based on an input, iii) a second plurality of taps including a second plurality of coefficient inputs—each configured to receive a respective one of second coefficients, wherein the second plurality of taps are configured to filter the first output signal to generate a second output signal. The control circuit is configured to limit a sum of the first coefficients and the second coefficients to a first predetermined range based on the coefficient of the unity tap.

19 Claims, 6 Drawing Sheets

FIG.1

Related Art

FIG.2

Related Art

Precursor   Main   Postcursor

FEEDFORWARD EQUALIZER FOR DFE BASED DETECTOR

CROSS-REFERENCE TO RELATED APPLICATIONS

This present disclosure is a continuation of U.S. application Ser. No. 12/283,664, filed on Sep. 15, 2008 (now U.S. Pat. No. 8,031,765), which is a continuation of U.S. application Ser. No. 11/011,178 (now U.S. Pat. No. 7,426,236), filed on Dec. 15, 2004, which is a continuation of U.S. application Ser. No. 09/644,532, filed on Aug. 24, 2000 (now U.S. Pat. No. 6,870,881).

BACKGROUND

1. Field of the Invention

This invention relates generally to a feedforward equalizer used in conjunction with a decision feedback equalizer in a data communications channel. More particularly the present invention relates to a feedforward equalizer used in conjunction with a decision feedback equalizer for a gigabit Ethernet transceiver.

2. Background Information

A feedforward equalizer is an extremely useful component of a digital signal processor used to shape and otherwise to filter an input signal so as to obtain an output signal with desired characteristics. Feedforward equalizers may be used in such diverse fields as Ethernet transceivers, read circuits for disk drives, ghost cancellation in broadcast and cable TV transmission, channel equalization for communication in magnetic recording, echo cancellation, estimation/prediction for speech processing, adaptive noise cancellation, etc.

A feedforward equalizer is particularly suited for filtering inter-symbol interference (ISI). To varying degrees, ISI is always present in a data communications system. ISI is the result of the transmission characteristics of the communications channel, i.e., the "channel response," and, generally speaking, causes neighboring data symbols, in a transmission sequence, to spread out and interfere with one another. If the channel response is bad, or severe, ISI becomes a major impediment to having low error rate communications between two data endpoints. In fact, at higher data rates, i.e., frequencies, the effect of ISI is more severe since there is more high frequency attenuation in the transmission channel. Consequently, current efforts to push transmission speeds higher and higher in the local loop environment must effectively contend with ISI effects on a transmitted data signal to be successful.

Figure 1:
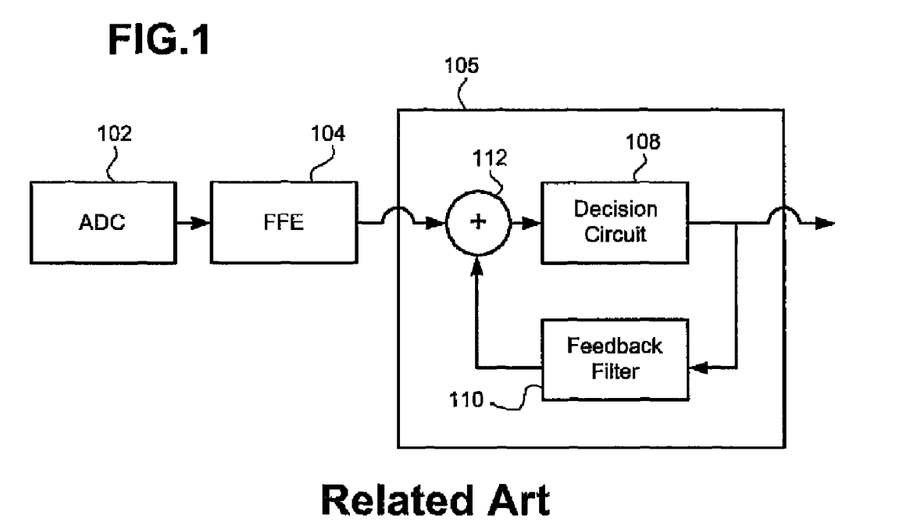
FIG. 1 is a block diagram of a feedforward equalizer used in conjunction with a decision feedback equalizer.

Generally speaking, the ISI can be divided into two components, namely precursor and post cursor ISI. Conventionally a feedforward equalizer (FFE) attempts to remove precursor ISI, and decision feedback equalization (DFE) attempts to remove postcursor ISI. FIG. 1 is illustrative of a conventional feedforward equalizer used in conjunction with decision feedback equalizer in a data communications channel. As shown in FIG. 1, an analog input signal from a communication channel is converted to a digital signal by analog-to-digital converter 102. The digital signal is processed by FFE 104 and DFE 105 in a conventional manner. DFE 105 comprises decision circuit 108 and feedback filter 110. Examples of conventional arrangements are discussed in U.S. Pat. Nos. 5,513,216 and 5,604,769, the contents of each of which are incorporated by reference herein.

Figure 2:
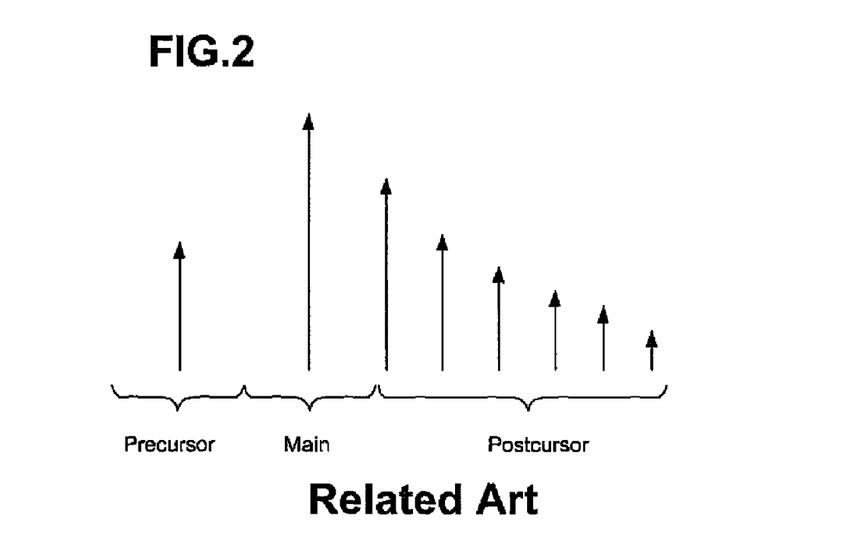
FIG. 2 illustratively shows the length of the postcursor intersymbol interference (ISI) when an input signal is processed by a conventional arrangement.

However, in conventional arrangements, the length of the postcursor ISI is rather large, as shown in FIG. 2. To process a signal with a long tail, the feedback filter needs to have a proportionately large number of taps. This results in higher complexity and severe error propagation.

SUMMARY OF THE INVENTION

According to a first aspect of the present invention, a signal processing apparatus comprises an input circuit to receive an input signal. A feedforward equalizer comprises a high-pass filter and is responsive to the input circuit. A decision feedback equalizer comprises a decision circuit responsive to the feed forward equalizer and a feedback filter responsive to the decision circuit. The decision circuit is responsive to the feedback filter.

According to a second aspect of the present invention, the high-pass filter has a low cutoff frequency.

According to a third aspect of the present invention, the high-pass filter has a flat response.

According to a fourth aspect of the present invention, the high-pass filter has high attenuation at low frequency.

According to a fifth aspect of the present invention, the high-pass filter has high attenuation at low frequencies.

According to a sixth aspect of the present invention, the high attenuation is at least 20 db.

According to a seventh aspect of the present invention, the high-pass filter comprises a first finite impulse response (FIR) filter.

According to an eighth aspect of the present invention, the first FIR filter comprises M taps to filter precursor intersymbol interference (ISI), one main tap and N taps to filter postcursor ISI.

According to a ninth aspect of the present invention, each tap of the first FIR filter has a corresponding coefficient W as follows:

$$W_0 = \text{unity}$$

$$0 < \sum_1^M W_{-i} + W_o + \sum_1^n W_i \ll 1, \text{ and}$$

$$-1 < W_1, \ldots, W_n < 0.$$

According to a tenth aspect of the present invention, the input circuit comprises an analog-to-digital converter.

According to an eleventh aspect of the present invention, the decision circuit comprises a threshold circuit.

According to a twelfth aspect of the present invention, the decision circuit comprises a Viterbi detector.

According to a thirteenth aspect of the present invention, a first adaptive control circuit is provided to adapt the M taps for filtering precursor ISI and N taps for filtering.

According to a fourteenth aspect of the present invention, each of the N taps comprises a limiter to limit the range of adaptation of the N taps.

According to a fifteenth aspect of the present invention, the first adaptive control circuit is operable only during signal acquisition.

According to a sixteenth aspect of the present invention, the feedback filter comprises a second finite impulse response (FIR) filter.

According to a seventeenth aspect of the present invention, a second adaptive control circuit to adapt taps of the second FIR.

According to an eighteenth aspect of the present invention, a signal processing apparatus comprises an input means for receiving an input signal. A feedforward equalizer means is provided for feedforward equalizing by high-pass filtering the input signal received by the input means. A decision feedback equalizer means comprises a decision means for recovering data from an output of the feedforward equalizer means and a feedback filter means for filtering an output of the decision means. The decision means is responsive to the feedback filter means.

According to a nineteenth aspect of the present invention, the feedforward equalizer means has a low cutoff frequency.

According to a twentieth aspect of the present invention, the feedforward equalizer means has a flat response.

According to a twenty-first aspect of the present invention, the feedforward equalizer means has high attenuation at low frequency.

According to a twenty-second aspect of the present invention, the feedforward equalizer means has high attenuation at low frequencies.

According to a twenty-third aspect of the present invention, the feedforward equalizer means shortens a length of postcursor inter-symbol interference.

According to a twenty-fourth aspect of the present invention, the feedforward equalizer means attenuates any DC noise.

According to a twenty-fifth aspect of the present invention, the feedforward equalizer means attenuates baseline wander.

According to a twenty-sixth aspect of the present invention, the high attenuation is at least 20 dB.

According to a twenty-seventh aspect of the present invention, the feedforward equalizer means comprises a first finite impulse response (FIR) filter means for filtering the input signal.

According to a twenty-eighth aspect of the present invention, the first FIR filter means comprises M taps for filtering precursor ISI, one main tap and N taps for filtering postcursor ISI.

According to a twenty-ninth aspect of the present invention, each tap of the first FIR filter means has a corresponding coefficient W as follows:

$$W_0 = \text{unity}$$

$$0 < \sum_{1}^{M} W_{-i} + W_o + \sum_{1}^{n} W_i \ll 1, \text{ and}$$

$$-1 < W_1, \ldots, W_n < 0.$$

According to a thirtieth aspect of the present invention, the input means comprises an analog-to-digital converter means for converting an analog input signal to a digital signal.

According to a thirty-first aspect of the present invention, the decision means comprises a threshold circuit.

According to a thirty-second aspect of the present invention, the decision means comprises a Viterbi detector.

According to a thirty-third aspect of the present invention, a first adaptive control means is provided for adapting the M taps for filtering precursor ISI and N taps for filtering.

According to a thirty-fourth aspect of the present invention, each of the N taps comprises a limiting means for limiting the range of adaptation of the N taps.

According to a thirty-fifth aspect of the present invention, the first adaptive control means is operable only during signal acquisition.

According to a thirty-sixth aspect of the present invention, the feedback filter means comprises a second finite impulse response (FIR) filter means for filtering the output of the decision means.

According to a thirty-seventh aspect of the present invention, a second adaptive control means is provided for adapting taps of the second FIR means.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

The present invention will now be described with reference with to a feedforward equalizer used in an Ethernet transceiver device. Preferably, the feedforward equalizer (FFE) is embodied in an Integrated Circuit disposed between a digital interface and an RJ45 analog jack. The Integrated Circuit may be installed inside a PC on the network interface card or the motherboard, or may be installed inside a network switch or router. However, other embodiments include applications in read circuits for disk drives, ghost cancellation in broadcast and cable TV transmission, channel equalization for communication in magnetic recording, echo cancellation, estimation/prediction for speech processing, adaptive noise cancellation, etc. All such embodiments are included within the scope of the appended claims.

Moreover, while the invention will be described with respect to the functional elements of the FFE, the person of ordinary skill in the art will be able to embody such functions in discrete digital or analog circuitry, or as software executed by a general purpose processor (e.g., a CPU) or digital signal processor.

Figure 9:
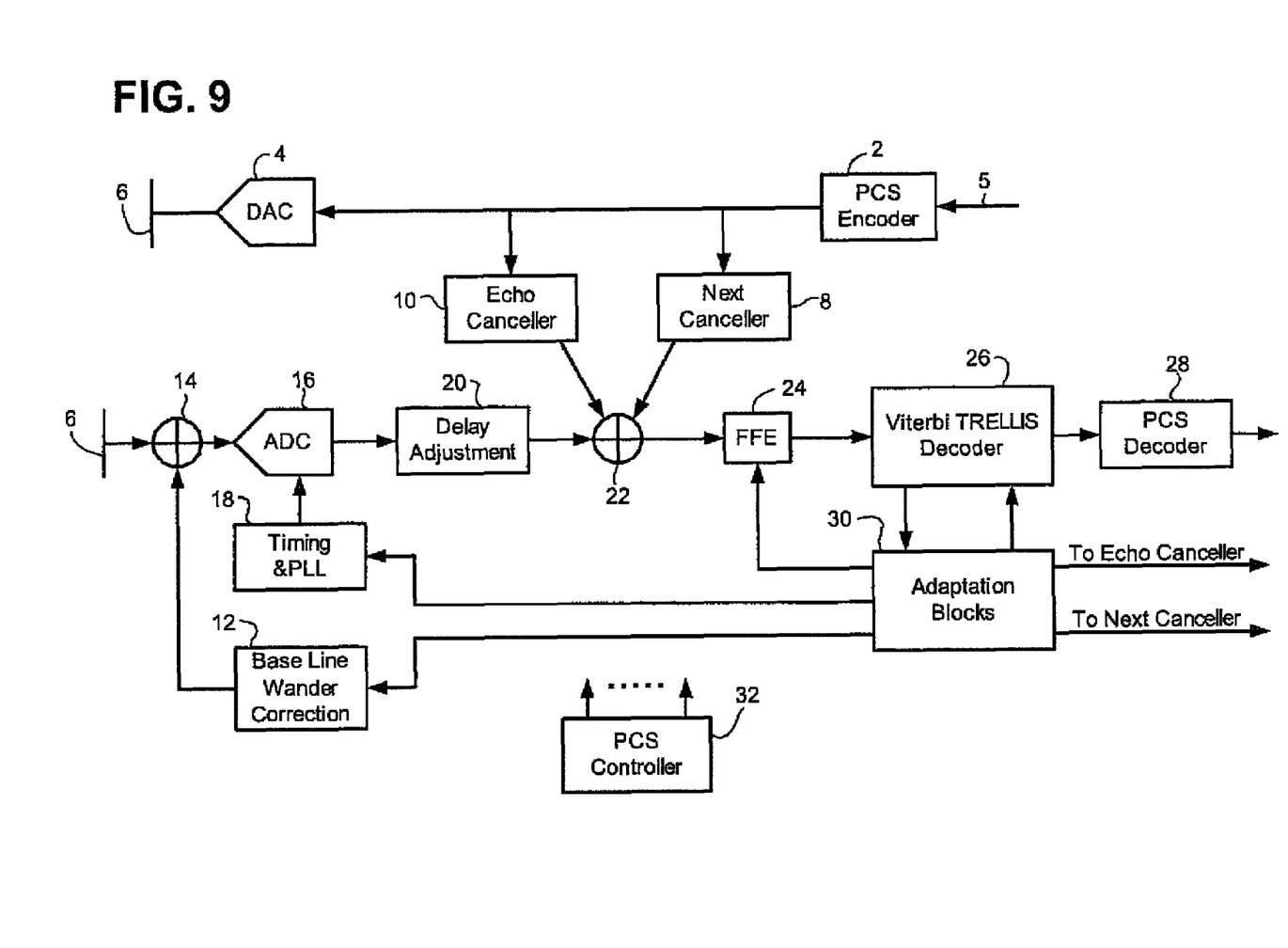
FIG. 9 is a block diagram of an Ethernet transceiver incorporating the feedforward equalizer used in conjunction with a decision feedback equalizer, in accordance with the present invention.

A functional block diagram of an Ethernet transceiver incorporating the FFE according to the present invention is depicted in FIG. 9. Although only one channel is depicted therein, four parallel channels are typically used in Gigabit Ethernet applications. Only one channel is depicted and described herein for clarity.

A 125 MHz, 250 Mbps digital input signal from a PC is PCS-encoded in a PCS encoder 2 and is then supplied to a D/A converter 4 for transmission to the Ethernet cable 6. The PCS-encoded signal is also supplied to a NEXT (Near End Transmitter) noise canceller 8 and to adaptive echo canceller 10.

Signals from the Ethernet cable 6 are received at adder 14 and added with correction signals supplied from baseline wander correction block 12 (which corrects for DC offset). The added signals are then converted to digital signals in the A/D converter 16, as controlled by timing and phase-lock-loop block 18. The digital signals from A/D converter 16 are supplied to delay adjustment block 20, which synchronizes the signals in accordance with the four parallel Ethernet channels. The delay-adjusted digital signals are then added with the echo-canceled signals and the NEXT-canceled signals in adder 22.

The added signals are supplied to a Feed Forward Equalizer filter 24 which filters the signal prior to DFE, or, more specifically, Viterbi trellis decoding in decoder 26. After Viterbi decoding, the output signal is supplied to PCS decoder 28, after which the PCS-decoded signal is supplied to the PC.

The decoder 26 also supplies output signals to a plurality of adaptation blocks schematically depicted at 30 in FIG. 9. As is known, such adaptation blocks carry out corrections for such conditions as temperature offset, connector mismatch, etc. The adaptation block 30 provides output to the baseline wander correction circuit 12, the timing and phase-lock-loop circuit 18, the echo canceller 10, and the NEXT canceller 8. Each functional block depicted in FIG. 9 includes a slave state controller (not shown) for controlling the operation and timing of the corresponding block.

Figure 3:
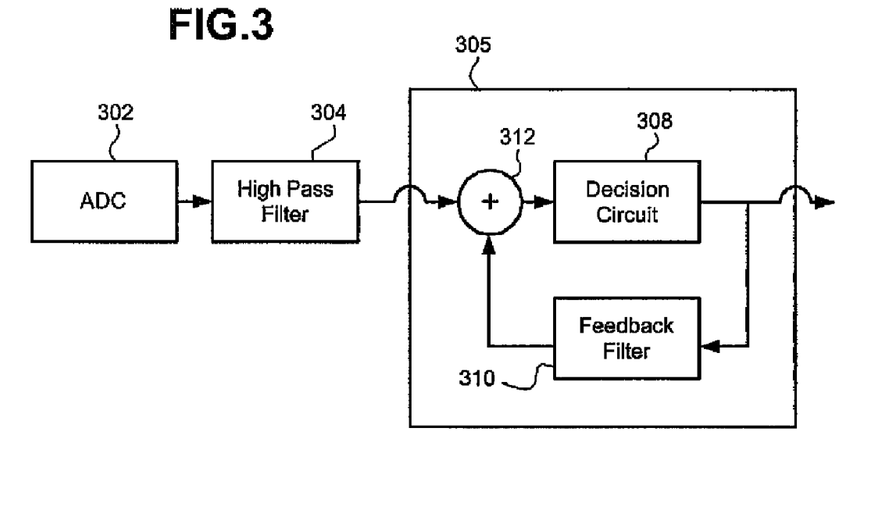
FIG. 3 is a block diagram of a feedforward equalizer implemented as a high-pass filter used in conjunction with a decision feedback equalizer, in accordance with a first embodiment of the present invention.
Figure 4:
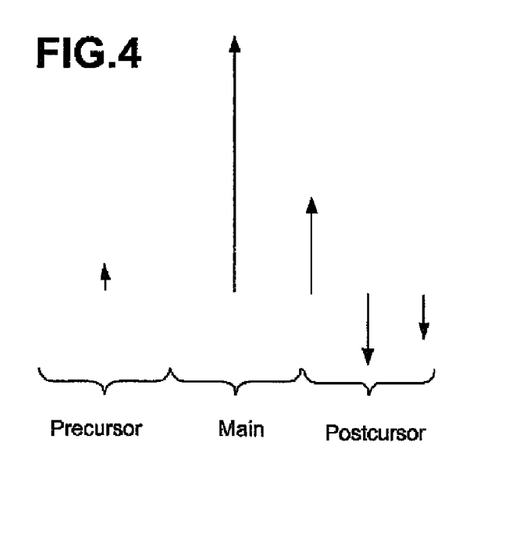
FIG. 4 illustratively shows the length of the postcursor ISI of when an input signal is processed by the present invention.

Reference is now made to FIG. 3 which shows a block diagram of a feedforward equalizer implemented as a high-pass filter used in conjunction with a decision feedback equalizer, in accordance with a first embodiment of the present invention. As shown therein, an analog input signal is converted to a digital signal by analog-to-digital converter (ADC) 302. The FFE 304 processes the digitized input signal to effectively cancel the precursor intersymbol interference (ISI) and shorten the length of the postcursor ISI. FIG. 4 illustratively shows the shortened length of the postcursor ISI when an input signal is processed by FFE 304 of the present invention. FFE 304 is preferably implemented as a high-pass filter to shorten the tail. The output of FFE 304 is then processed by DFE 305 to effectively cancel the postcursor ISI in a known manner. DFE 305 comprises decision circuit 308 and feedback filter 310. Decision circuit 308 may be implemented by, for example, a threshold circuit, a Viterbi detector or the like. Feedback filter 310 is preferably implemented as a Finite Impulse Response (FIR) filter.

Figure 5:
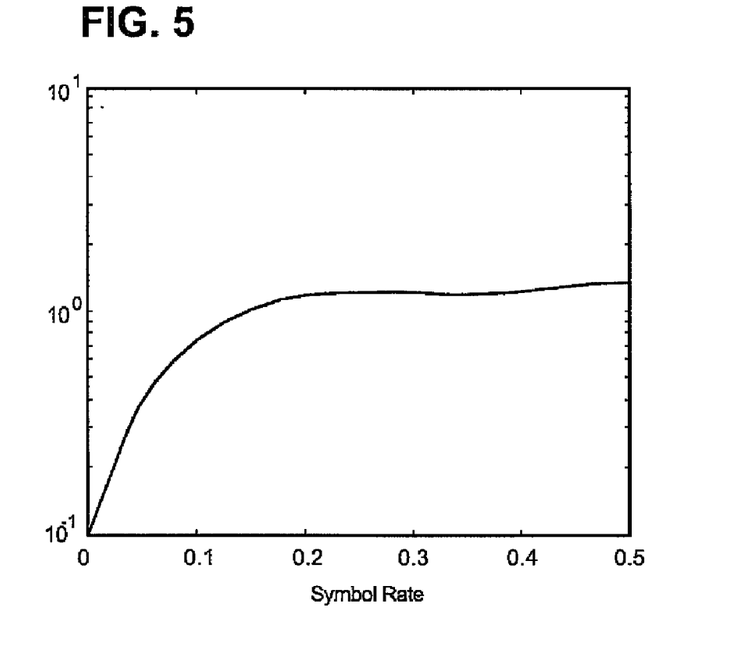
FIG. 5 illustrates the frequency response of the high-pass filter in accordance with FIG. 3.

FIG. 5 illustrates the response characteristics of high-pass filter of FFE 304. The filter has a low cutoff frequency. As can be seen in FIG. 5, at higher frequencies the filter has a relatively flat response and has high attenuation at low frequencies (preferably 20 db). This characteristic is advantageous in attenuating any DC noise and any DC components caused by baseline wander. Significantly, the flat response reduces noise enhancement.

Figure 6:
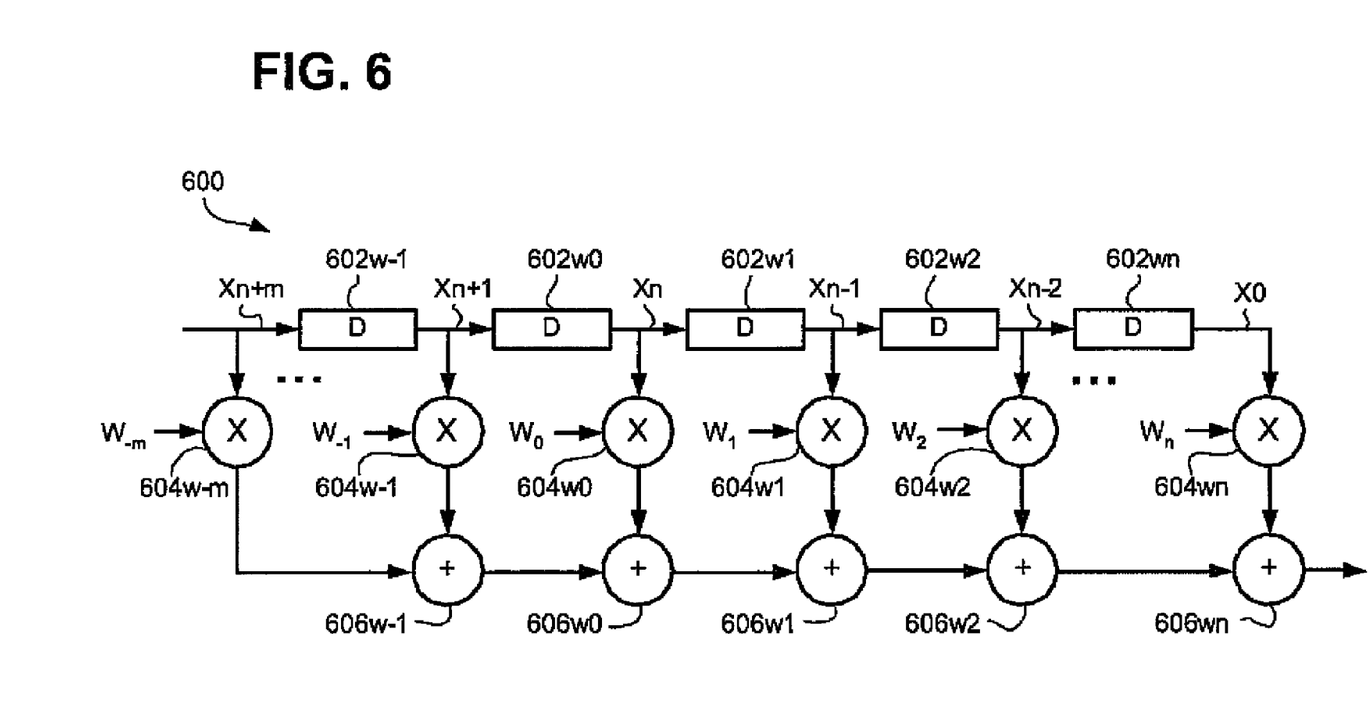
FIG. 6 is a schematic drawing of the high-pass filter of FIG. 3 implemented as an finite impulse response (FIR) filter.

Referring now to FIG. 6, high-pass filter 304 is preferably implemented as a finite impulse response (FIR) filter 600. FIR filter 600 comprises M taps for filtering precursor ISI, one main tap and N taps for filtering postcursor ISI. In the preferred embodiment M=1 and N=3. Each tap comprises a delay 602 (except for the first tap), a multiplier 604 and a summer 606 (except for the first tap). Delay circuit 602 delays an output from a previous tap, and multiplier 604 multiples the output from delay circuit 602 by a coefficient W. The output of multiplier 604 is added to an output from of previous tap by summer 606.

The selection of the coefficients W is critical in providing the response defined in FIG. 5. The appropriate selection of coefficients $W_1, \ldots, W_n$ determines the sharpness of the response, and the appropriate selection of coefficients $W_{-m}$-$W_{-1}$ effectively cancels the precursor tail. In the present embodiment the coefficients are selected from the following constraints:

$$W_0 = \text{unity}$$

$$0 < \sum_{1}^{M} W_{-i} + W_o + \sum_{1}^{n} W_i \ll 1$$

$$-1 < W_1, \ldots, W_n < 0,$$

in the preferred embodiment $W_0=1$;

$W_{-1}=-0.1$;

$W_{-1}+W_0+W_1+W_2+W_3=0.1$;

$|W_1|>|W_2|>|W_3|$; and $-1<W_1, W_2, W_3<0$, preferably $W_1=-0.35$, $W_2=-0.25$, and $W_3=-0.20$.

As will be appreciated by one of ordinary skill in the art, the preferred values discussed above may be proportionately varied to still achieve very similar and acceptable responses.

Figure 7:
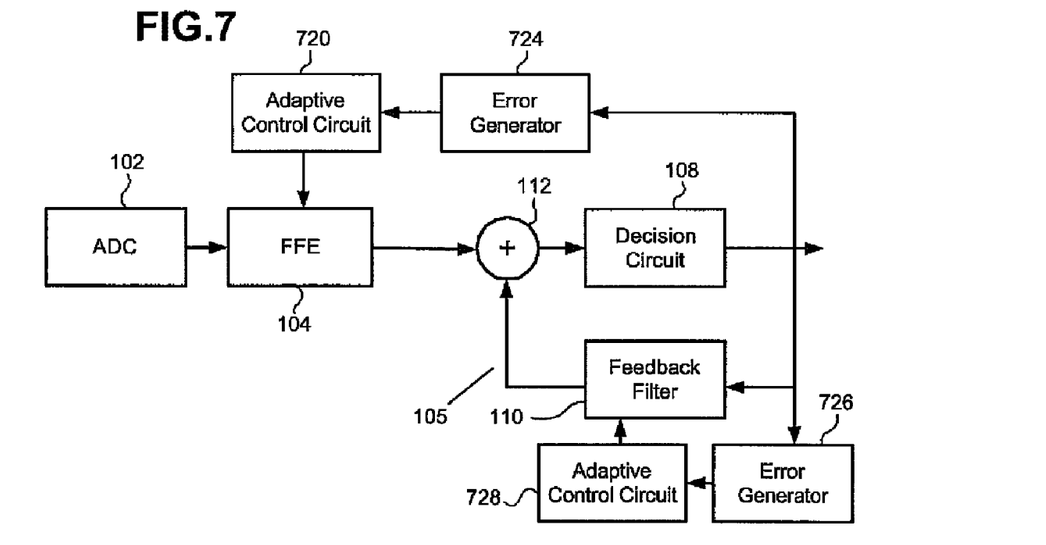
FIG. 7 is a block diagram of a feedforward equalizer implemented as an adaptive high-pass filter used in conjunction with a decision feedback equalizer, in accordance with a second embodiment of the present invention.

FIG. 7 is an alternate embodiment of the present invention, in which the coefficients of the FIR filter of the FFE are adaptive and the coefficients of the FIR filter of the feedback filter are also adaptive. In general, an error generator circuit 724 is provided to determine any errors during signal acquisition, and an error signal is provided to an adaptive control circuit 720 to move the coefficients of the FFE. These coefficients of the FFE are only moved during signal acquisition. After acquisition, the coefficients of the FFE are then held at the values determined during acquisition. Also, an error generator 726 determines if there are any errors from feedback filter 110 and provides an error signal to adaptive control circuit 728. Adaptive control circuit 728 moves coefficients for feedback filter 110.

Figure 8:
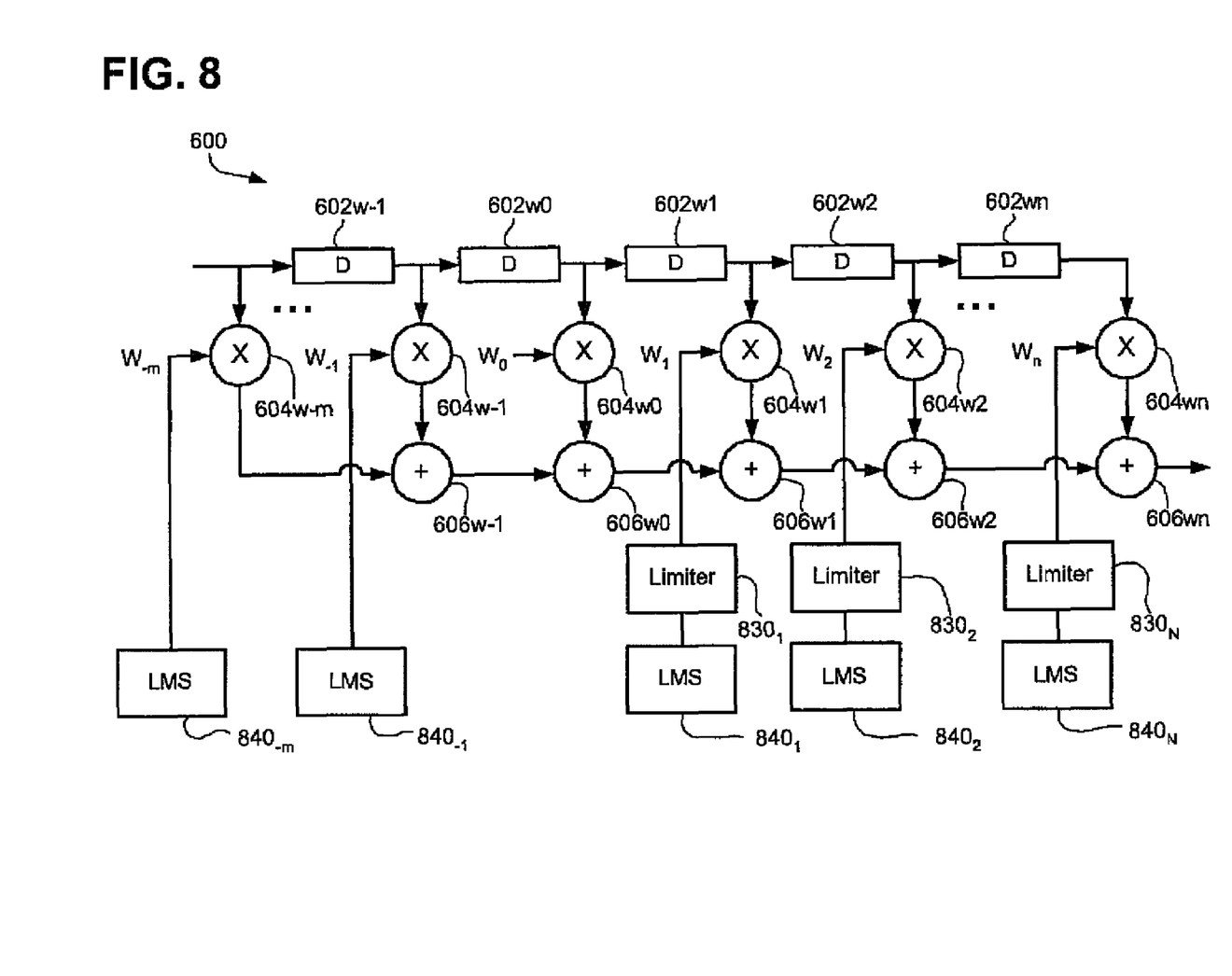
FIG. 8 is a schematic drawing of the high-pass filter of FIG. 7 implemented as an adaptive finite impulse response (FIR) filter.

FIG. 8 shows a more detailed schematic of an adaptive FIR filter for FFE. As shown therein, the main tap $W_0$ is kept at its initial value and is not adapted. Coefficients $W_{-m}, \ldots, W_{-1}$ can be determined by LMS engines $840_{-m}, \ldots, 840_{-1}$ in accordance with a least mean square (LMS) algorithm based on gradient optimization. The change in tap weight coefficients $\Delta Wn$ is calculated to be $\Delta Wn=\Delta Xn*En$, where $\Delta$ is the adaptation rate and E is the error output by the error generator 724. Coefficients $W_1, \ldots, W_n$ are similarly determined by LMS engines $840_1, \ldots, 840_n$. In addition limiters $830_1, \ldots, 830_n$ are provided to enforce the constraints discussed above.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A transceiver comprising:
an equalizer, wherein the equalizer includes
   i) a unity tap comprising a coefficient input configured to receive a coefficient equal to 1,
   ii) a first plurality of taps, wherein the first plurality of taps include a first plurality of coefficient inputs, wherein the first plurality of taps are configured to receive an input signal, and filter the input signal to generate a first output signal, and wherein the first plurality of coefficient inputs are each configured to receive a respective one of first coefficients, and
   iii) a second plurality of taps, wherein the second plurality of taps include a second plurality of coefficient inputs, wherein the second plurality of taps are configured to filter the first output signal to generate a second output signal, wherein the second plurality of coefficient inputs are each configured to receive a respective one of second coefficients, wherein the unity tap is connected between the first plurality of taps and the second plurality of taps, and wherein the unity tap is configured to receive the first output signal, and wherein a first one of the second plurality of taps is configured to receive an output of the unity tap; and
a control circuit configured to limit a sum of the first coefficients and the second coefficients to a first predetermined range based on the coefficient of the unity tap.

2. The transceiver of claim 1, wherein:
the first plurality of taps are configured to filter precursor inter-symbol interference in the input signal to generate the first output signal; and
the second plurality of taps are configured to filter postcursor inter-symbol interference in the first output signal to generate the second output signal.

3. The transceiver of claim 1, wherein the control circuit is configured to limit the second coefficients to the first predetermined range.

4. The transceiver of claim 1, wherein:
a first one of the first plurality of taps is configured to receive the input signal;
the input signal is a digital signal; and
the first plurality of taps are configured to generate the first output signal in response to the input signal.

5. The transceiver of claim 1, wherein the first predetermined range is between −1 and 0.

6. The transceiver of claim 1, wherein:
the control circuit is configured to limit a sum of the coefficient of the unity tap, the first coefficient, and the second coefficients to a second predetermined range; and
the second predetermined range is different than the first predetermined range.

7. The transceiver of claim 6, wherein the second predetermined range is between 0 and 1.

8. The transceiver of claim 6, wherein:
the control circuit is configured to adjust (i) one of the first coefficients and (ii) the second coefficients; and
subsequent to the adjustment, the sum of (i) the coefficient of the unity tap, (ii) the one of the first coefficients, and (iii) the second coefficients is equal to a predetermined value.

9. The transceiver of claim 8, wherein the predetermined value is equal to 0.1.

10. The transceiver of claim 6, further comprising an error generator configured to generate an error signal,
wherein the control circuit is configured to limit at least the first coefficients based on the error signal.

11. The transceiver of claim 1, wherein:
the first plurality of taps comprise
   i) first multipliers each configured to multiply one of the first coefficients by one of the input signal and first delayed versions of the input signal, and
   ii) a first summer configured to sum outputs of at least two of the first multipliers to generate the first output signal; and
the second plurality of taps comprise
   i) second multipliers, wherein each second multiplier is configured to multiply one of the second coefficients by second delayed versions of the input signal, and
   ii) a plurality of summers comprising a second summer and a third summer, wherein each of the second summer and the third summer is configured to sum an output of the second multipliers with a sum generated based on an output of the first summer.

12. The transceiver of claim 1, further comprising:
a first device configured to adjust one of the first coefficients using a least means square algorithm; and
a second device configured to adjust one of the second coefficients using a least means square algorithm.

13. The transceiver of claim 1, wherein the control circuit is configured to adjust the first coefficients or the second coefficients based on an adaptation rate.

14. The transceiver of claim 1, wherein the equalizer is a first equalizer and the transceiver further comprises a second equalizer configured to receive the second output signal and cancel postcursor inter-symbol interference from the second output signal.

15. The transceiver of claim 14, wherein the second equalizer comprises:
a decision circuit configured to receive a summation signal;
a feedback filter configured to filter an output of the decision circuit; and
a summer configured to sum the second output signal and an output of the feedback filter to generate the summation signal.

16. The transceiver of claim 15, wherein the decision circuit is implemented as one of a threshold circuit and a Viterbi detector.

17. The transceiver of claim 1, further comprising an error generator configured to (i) detect errors generated during signal acquisition, and (ii) generate an error signal,
wherein the control circuit configured to adaptively adjust the first coefficients or the second coefficients based on the error signal.

18. The transceiver of claim 17, wherein the control circuit is further configured to adjust the first coefficients or the second coefficients based on an adaptation rate.

19. The transceiver of claim 17, wherein:
the equalizer is a first equalizer;
the transceiver further comprises a second equalizer;
the second equalizer is configured to receive the second output signal; and
the error generator is configured to generate the error signal in response to an output of the second equalizer.

* * * * *